Nov. 21, 1939. L. E. WILLSON Re. 21,278
BUILDING WALL STRUCTURE
Original Filed July 22, 1936
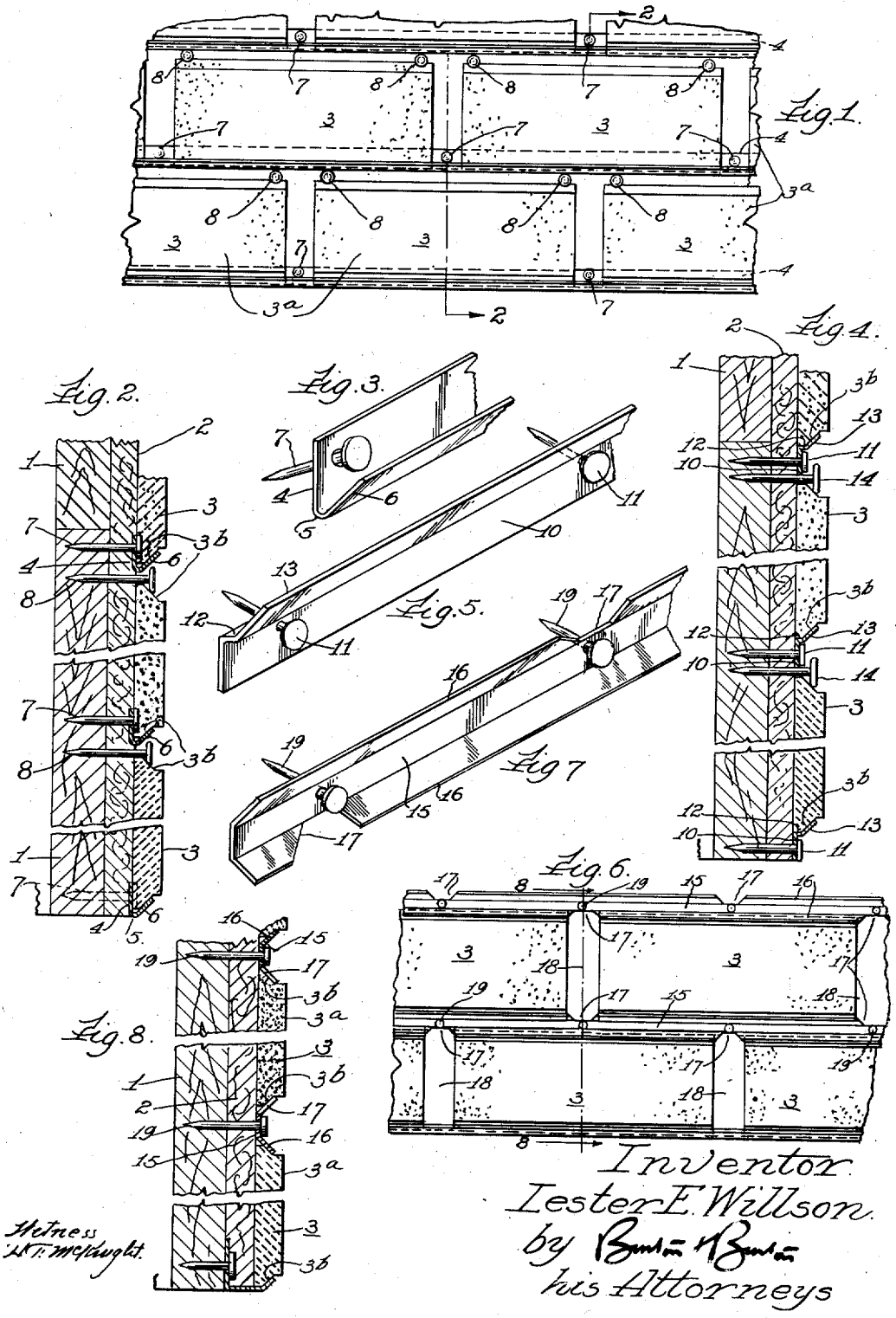

Reissued Nov. 21, 1939 Re. 21,278

UNITED STATES PATENT OFFICE 21,278

BUILDING WALL STRUCTURE

Lester E. Willson, Streator, Ill., assignor to Brick-V-Neer Sales Company, Streator, Ill., a corporation of Illinois Original No. 2,093,262, dated September 14, 1937, Serial No. 91,850, July 22, 1936. Application for reissue September 12, 1939, Serial No. 294,509

6 Claims. (Cl. 72—19)

This invention relates to building wall construction and is directed to producing a wall having the appearance of a standard brick wall but employing relatively thin slabs or tiles in place of ordinary brick in combination with other wall material to which such tiles are secured. One object of the invention is to provide a structure which may be rapidly and accurately erected by ordinary mechanics, not necessarily skilled as masons. Another object is to provide a wall surface structure which may be applied to old or new basic walls, both for the sake of its ornamental value and because of its heat-insulating properties and weather-resisting qualities. The invention consists of the features and elements of construction herein shown and described in combination as indicated in the claims.

In the drawing:

Figure 1 is a partial elevation of a section of building wall constructed in accordance with this invention.

Figure 2 is a vertical section taken as indicated by line 2—2 on Figure 1.

Figure 3 is a detail perspective view of a supporting rail of the type shown in Figure 2.

Figure 4 is a section similar to Figure 2 showing a modified form of tile-securing means.

Figure 5 is a perspective view of a section of the securing rail shown in Figure 4.

Figure 6 is an elevation similar to Figure 1, illustrating a further modification of the tile-holding means.

Figure 7 is a detail view in perspective of a supporting rail of the type shown in Figure 6.

Figure 8 is a sectional detail taken as indicated at line 8—8 on Figure 6.

This improved wall structure may be employed in various situations, but a typical use for it is in combination with "frame" or wooden buildings, in place of shingles, siding, stucco or other external surface finish. Such a structure usually includes frame members or joists, not shown, which are externally covered with wooden sheathing indicated at 1 in Figures 2, 4 and 8. The structure embodying my invention includes a backing layer, 2, which may be, and is preferably, a composition board such as "Celotex" or some similar material,—preferably one having heat-insulating qualities, together with an outer layer composed of relatively thin tiles, 3, which may be manufactured from various qualities and mixtures of clay similar to that used for making bricks, and which may be burned in accordance with methods already perfected, so that they shall have substantially the same properties and appearance as regular brick. The outer face, $3^a$, of each tile is preferably, though not necessarily, of the same dimensions as the standard building brick, and, as indicated in Figure 1, the tiles, 3, are arranged in rows, "breaking joints" so as to give the appearance of a regular brick wall. Preferably, at least two edges, and, as shown, the upper and lower edges of each tile, are beveled as seen at $3^b$ for engagement with some form of securing means by which they are held flatly against the outer face of the backing sheet, 2. Figures 1, 2 and 3 show a metallic strip, 4, bent at 5 to provide a transversely extending lip or flange, 6, disposed at a suitable angle to the portion, 4, so that when the part, 4, is secured flatly against the face of the backing, 2, the portion, 6, will engage the lower beveled edges, $3^b$, of a plurality of the tiles in one row. The metallic strip may be made of any desired length and secured in place before the tiles are applied to the wall, thus ensuring their proper alignment. In the form shown in Figures 1 to 3 the strip is secured by means of nails, 7, driven through the portion, 4, and this portion lies under the row of tiles, 3, which the strip supports, leaving only the lip, 6, exposed to be covered by the mortar and tuck-pointing which is added in the joints, but not shown in the drawing. The upper beveled edges of the tiles are engaged by the heads of securing nails, 8, disposed in the joints at convenient locations; in some cases one nail to each tile will be sufficient, but as shown in Figure 1, there are two such nails, 8, engaging the upper edge of each tile.

Figures 4 and 5 show a modified form of metallic holding strip having a web, 10, which is secured flatly against the backing, 2, by nails, 11, and is disposed in the joints or spaced between adjacent rows of tiles. At one edge the web is offset at 12, and then bent obliquely to provide a flange or lip, 13, so that the offset portion, 12, and the lip, 13, conform substantially to the beveled contour of the lower edges of a row of tiles for engaging and supporting them. The opposite or upper edges of each row of tiles are held in place by nails, 14, engaging the beveled edges in the same manner as the nails, 8, previously described.

If it is preferred to dispense with these additional holding nails, the continuous strips of sheet metal may be made as shown in Figures 6, 7 and 8, and may constitute the sole retaining means for the tiles. In this form each strip includes a middle web portion, 15, with flanges, 16, extending divergently from the web so that when the web portion, 15, is nailed flatly against the backing, 2, in the space or joint between adjacent rows of tiles, the wings or flanges, 16, will engage the beveled edges of two consecutive rows of tiles, 3, as seen in Figures 6 and 8. Preferably, this channel form of holding strip has notches, 17, disposed at intervals in its flanges, 16, to register with the vertical joints, 18, between the tiles so that the mortar in the vertical joints, 18, may be continuous with that in the horizontal joints or spaces.

Thus, whichever of the alternative strips is employed, the erection of a wall of this type will be greatly facilitated because the strips themselves not only support the tiles at their lower edges but align them, and where single flanged strips of the types shown in Figures 3 and 5 are employed, several strips may be attached to the face of the backing, 2, on the side of the building in parallel relation to each other, ready to receive the tile, and the tile may then be laid up very rapidly by lodgment on these strips and final securement by means of the nails, 8, or 14.

While there is shown and described herein certain specific structure embodying the invention, it will be manifest to those skilled in the art that various modifications and rearrangements of the parts may be made without departing from the spirit and the scope of the invention, and that the same is not limited to the particular form herein shown and described, except in so far as indicated by the appended claims.

I claim:

1. A wall structure which includes a backing layer and a layer of separate individual facing tiles disposed flatly in close contact with the outer surface of said backing, said tiles being placed in rows and spaced from each other, and securing means including a continuous member engaging the lower edges of a plurality of tiles for supporting them in longitudinal alignment, said member including a portion secured flatly against the backing and a portion extending transversely therefrom to afford lodgment for the lower edges of the tiles, said transverse portion being interrupted at intervals adapted to register with the spaces between tiles at vertical joints in the wall.

2. A wall structure which includes a backing and a layer of separate individual facing tiles disposed flatly in close contact with the outer surface of said backing, said tiles being arranged in rows and spaced from each other, the upper and lower edges of each tile being beveled converging outwardly, and securing means including a continuous metallic member having a web dimensioned to extend horizontally throughout the space between consecutive rows of tiles with flanges inclined outwardly from the web at its opposite edges for engaging respectively the beveled edges of vertically adjacent tiles and supporting them in longitudinal alignment.

3. In a wall structure which includes a backing layer and a layer of separate individual facing tiles disposed in close contact with the outer surface of said backing and arranged in horizontally extending rows, the upper and lower edges of each tile being beveled converging outwardly, an aligning and supporting member relatively rigid in vertical direction, including a portion to be secured flatly against said backing layer and a flange or lip extending in a plane inclined to said portion and overlying it, said lip extending from said surface by a distance substantially less than the thickness of the tile and affording lodgment for the lower edges of a row of tiles, together with means securing the first mentioned portion of said member to the backing layer.

4. A wall structure which includes a backing and a layer of straight individual facing tiles disposed flatly in close contact with the outer surface of said backing, said tiles being arranged in rows and spaced from each other with spaces between the tiles of each row, the spaces between the tiles of one row being staggered with respect to those in the next row and the upper and lower edges of each tile being beveled converging outwardly, and securing means including a continuous metallic member having a web dimensioned to extend horizontally throughout the space between consecutive rows of tiles with flanges inclined outwardly from the web at its opposite edges for engaging vertically adjacent tiles and supporting them, said flanges being interrupted at intervals registering with the spaces between the tiles of each row whereby the interruptions in one flange of the member are staggered with respect to those of the other flange.

5. A wall structure which includes a backing layer and a layer of separate individual facing tiles disposed flatly in close contact with the outer surface of said backing, said tiles being placed in rows and spaced from each other, and securing means engaging the lower edges of the tiles for supporting them in longitudinal alignment, said means including portions secured flatly against the backing and portions extending transversely therefrom to afford lodgment for the lower edges of the tiles, said transverse portions being no longer than the individual tiles so as not to extend into the spaces between tiles at vertical joints in the wall.

6. In a wall structure which includes a backing layer and a layer of separate individual facing tiles disposed in close contact with the outer surface of said backing and arranged in horizontally extending rows, the upper and lower edges of each tile including beveled surfaces converging outwardly, aligning and supporting means relatively rigid in vertical direction and disposed in spaced parallel arrangement on the backing, said means each including a portion secured flatly against said backing, and a flange or lip extending in a plane inclined to said portion and overlying it, such lips extending from said surface by a distance substantially less than the thickness of the tile and affording lodgment for the lower edges of the tiles.

LESTER E. WILLSON.